Dec. 8, 1942.   W. A. AYRES   2,304,434
PROJECTING DEVICE
Original Filed Sept. 3, 1928   4 Sheets-Sheet 1

INVENTOR.
Waldemar A. Ayres
BY
ATTORNEY

Dec. 8, 1942. W. A. AYRES 2,304,434
PROJECTING DEVICE
Original Filed Sept. 3, 1928  4 Sheets-Sheet 3
FIG. 5.
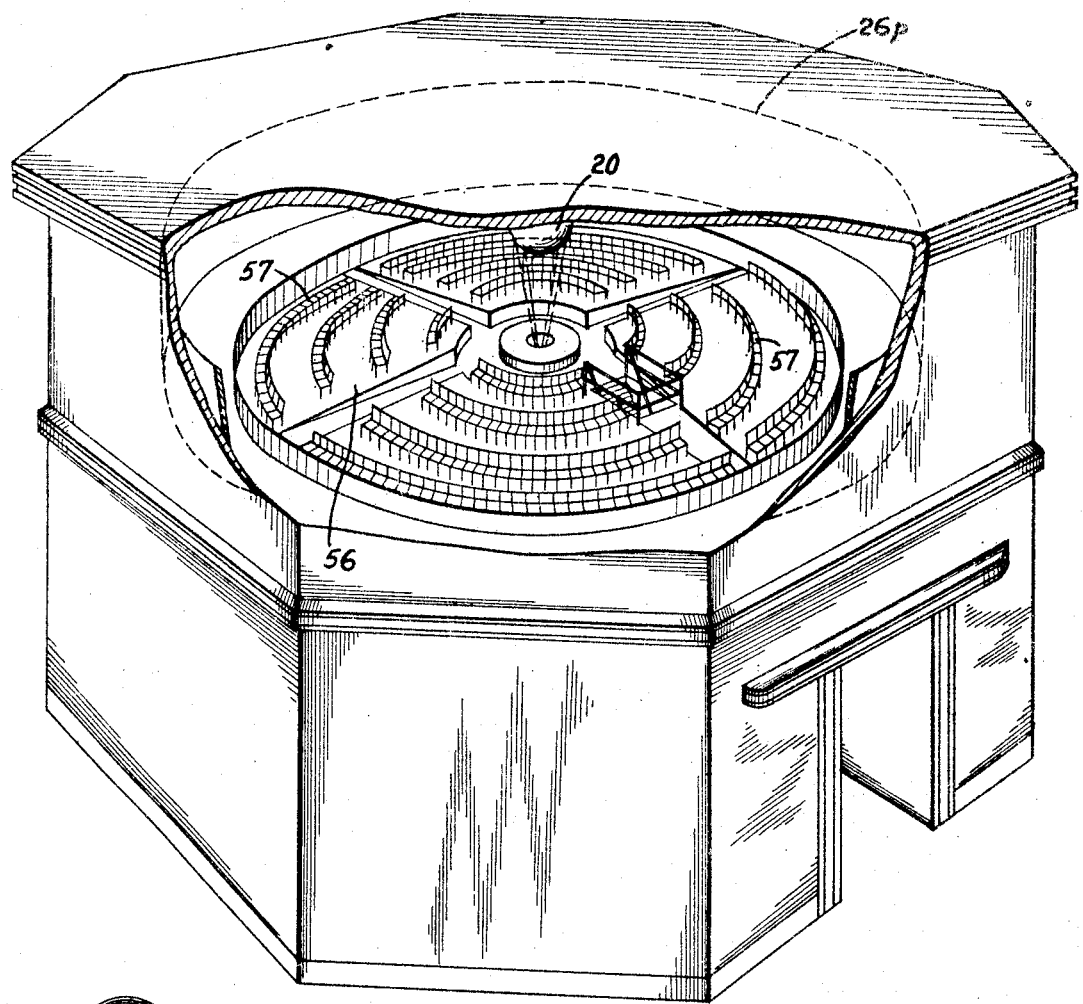
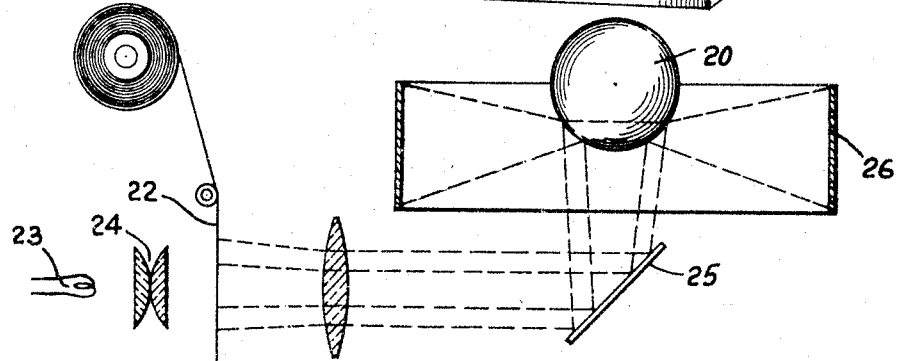
FIG. 6.
INVENTOR.
Waldemar A. Ayres
BY
ATTORNEY

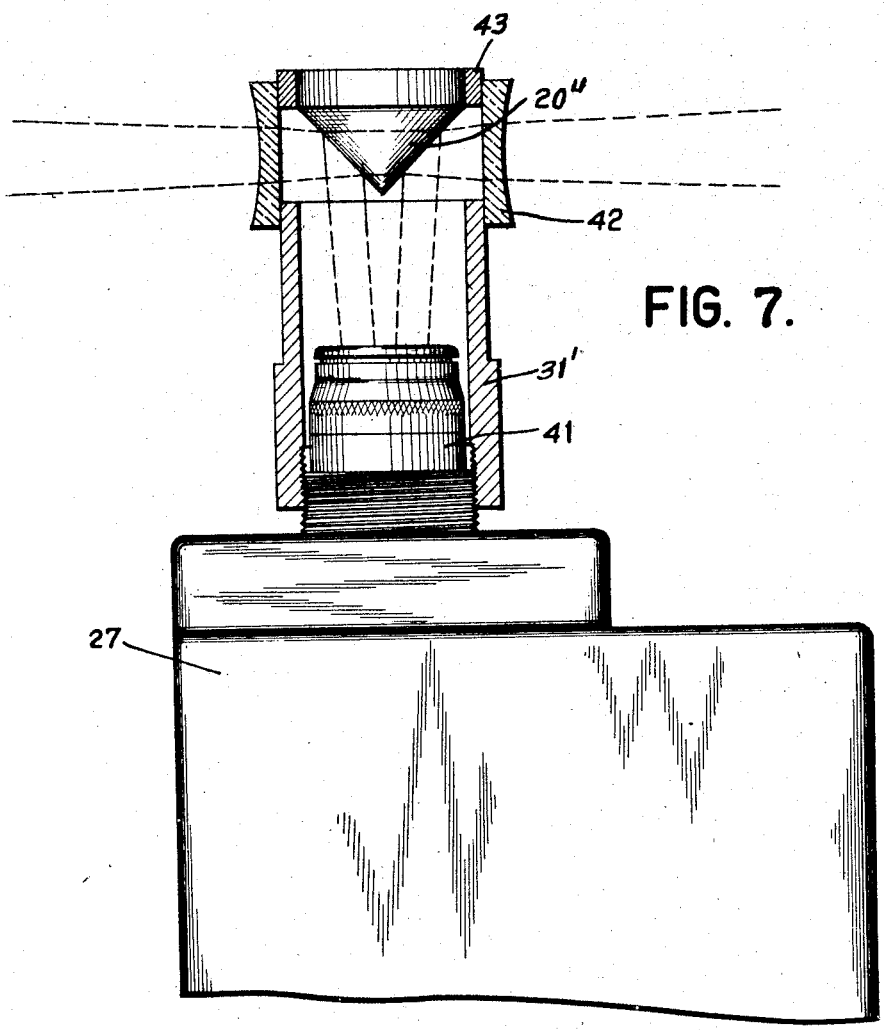

Patented Dec. 8, 1942

2,304,434

UNITED STATES PATENT OFFICE 2,304,434

PROJECTING DEVICE

Waldemar A. Ayres, Elmhurst, Long Island, N. Y., assignor to International Business Machines Corporation, New York, N. Y., a corporation of New York Original application September 3, 1928, Serial No. 228,327. Divided and this application December 21, 1940, Serial No. 372,424

3 Claims. (Cl. 88—24)

This application is a division of the copending application Serial No. 228,327, filed September 3, 1928, and issued as Patent 2,244,235 on June 3, 1941.

This invention relates to improved devices for recording and projecting cycloramic still or moving pictures.

An object of the invention is the provision of a spherical or conical reflector or prism so associated with a camera or projector that pictures of a complete 360° range of vision may be recorded and projected.

A feature of the invention is the association of periscopic devices with a reflector to adapt it for use with a camera or projector operated in a normal position.

Another object of the invention is the provision of a projection room with a continuous circular screen inside the walls, a raised center point of projection, an interior stair well and outwardly forcing seats radiating from said center point.

A further object of the invention is the provision of reflector holding devices of a form common to both camera and projector to be interchangeable thereon.

Another object of the invention is the provision of a ground glass cylinder surrounding a reflector to receive a projected cycloramic image. Instead of ground glass, any other translucent picture retaining medium may be used for making the cylinder.

Another object of the invention is the provision of a projection room with a continuous circular screen inside the outer walls, a mounted circular point with an aperture through which pictures are projected up from beneath the room against a reflector on a ceiling and directed therefrom against the screen. The seats in the room face toward the center of the room and are raised progressively as they approach the outer walls.

Another feature of the present invention is a production of a film or plate with a circular picture thereon which appears as a complete cycloramic image when projected against a circular screen by means of a spherical or conical reflector.

Other objects of the invention will be pointed out in the following description and claims and illustrated in the accompanying drawings, which disclose, by way of example, the principle of the invention and the best mode, which has been contemplated, of applying that principle.

In the drawings:

Fig. 5 is a perspective view showing another form of exhibition room.

Fig. 6 is a diagrammatic view of the periscopic projecting devices of the present invention.

Fig. 7 is a sectional view showing the association of a conical reflector with a camera or projector and a cylindrical reducing lens for concentrating the cycloramic image.

Figure 3:
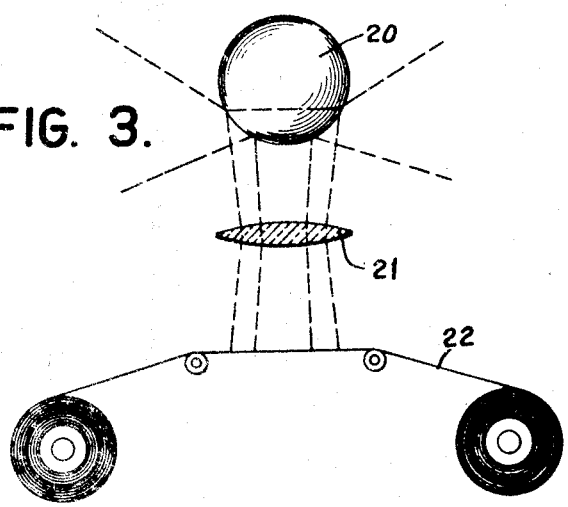
Fig. 3 is a diagrammatic view of the picture recording devices of the present invention.

Referring to the diagrammatic showing of Fig. 3 is it seen that the recording of a 360° cycloramic picture is made possible by supporting a spherical reflector 20 in front of the lens 21 behind which the film 22 is fed in a camera. The light reflected from all objects in all directions within an appreciable vertical range is reflected from the highly polished sphere 20 down through the lens of the camera against the film which is exposed by the usual shutter mechanism for the required interval of time.

In a somewhat similar fashion, projection of the recorded cycloramic image is carried out by means of the devices illustrated diagrammatically in Fig. 6. There it is seen that a light source or lamp 23 is mounted behind the enlarging lens 24 and each ray from the film 22 is directed right through against the periscopic reflector 25, against the underside of reflector 20 and over to the cylindrical picture receiving screen 26. This screen may be located at quite a distance from the reflector when it is made of opaque material and the pictures thereon are to be viewed from the inside. However, it is possible to arrange a translucent screen of small diameter around the reflector so that the projected picture thereon may be viewed from outside the periphery of the circular screen.

Figure 1:
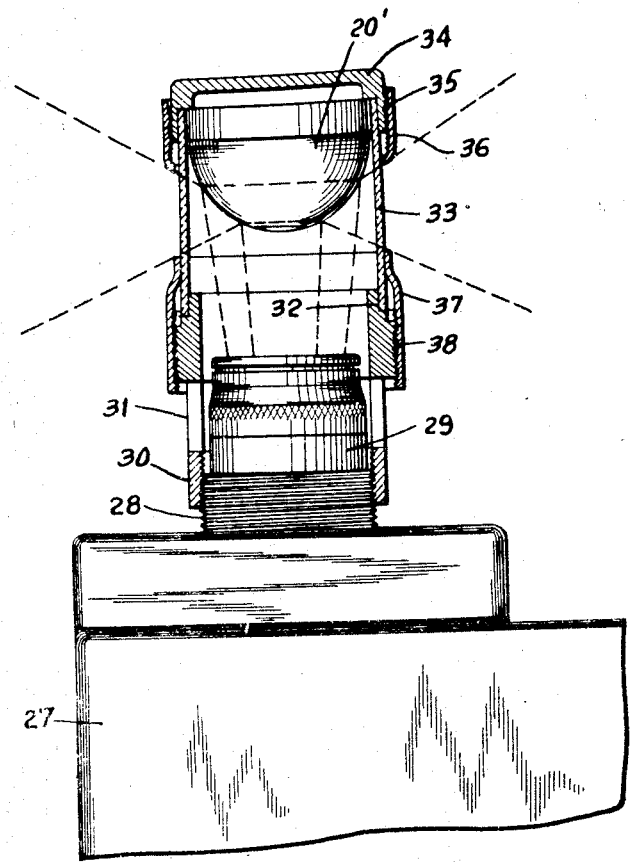
Fig. 1 is a sectional elevation view showing the association of a hemispherical reflector with a camera or projector.

Turning to Fig. 1 it is seen that the camera or projector 27 is provided with a threaded shoulder 28 through which the lens mounting 29 projects. Threaded on this shoulder 28 is the lower circular portion 30 of a standard 31 on which the reflector is mounted. The upper part of standard 31 is formed with a circular shoulder 32 in which is seated the lower end of a transparent cylinder 33 which in its upper end carries a hemispherical reflector 20'. The reflector and cylinder are held together by means of a cap 34 formed with threads 35 around its outer edge. Attached to cap 34 is a cylindrical mask 36 formed with interior threading proportioned to engage the threads 35 on cap 34 so that the mask may be turned by means of knurling thereon, and the mask is lowered or raised with respect to the reflector to vary the range of recording or projecting and limit the upper edge of the image received or sent by means of the reflector.

Another masking cylinder 37 is threaded at 38 to turn on the threaded upper part of standard 31 and to move vertically with relation to the reflector as it is adjusted by hand. This lower mask 37 acts as a lower limiting stop to shut off all undesirable rays of light from the bottom of the picture which is being recorded or projected. Between the two masks 36 and 37 there may be confined the desired range of cycloramic recording or projection.

Figure 2:
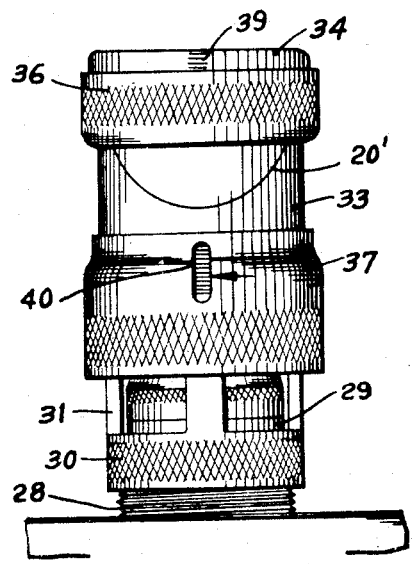
Fig. 2 is a side view of the parts shown in Fig. 1.

The cap 34, Fig. 2, is calibrated at 39 with indicating lines cooperating with the upper edge of mask 36 to indicate the position of the mask. In a similar fashion, the lower mask 37 is provided with an indication opening 40 and arrow pointing towards lines marked around the lower part of the cylinder 33 so that a reading may be taken to determine the location of the mask.

It may be noted that the lower part of standard 31 is formed with apertures at the sides through which the fingers may be inserted to adjust the focus of the lens in mounting 29.

In Fig. 7 there is shown a modified form of the devices described with reference to Figs. 1 and 2. In this modification it is noted that the reflector 20" is formed in a shape of an inverted cone. This reflector is poised over the lens opening 41 of a camera or projector 27 by means of a standard 31', and a cylindrical lens 42 and attachment ring 43 holds the reflector 20" centralized with relation to cylinder 42. It may be pointed out that the outer surface of the cylinder 42 is formed or ground to have the effect of a concentrating lens. This is done to reduce the range of recording or projection within the desired narrow range.

The cylinders 33, Figs. 1 and 2, instead of being made of transparent material may be made of ground glass or any other translucent material with a picture retaining surface to reveal a concentrated cycloramic picture directly surrounding the projector. If it is desired on the other hand that the pictures be exhibited over a wider area, then a transparent concentration cylinder such as the cylinder 42, Fig. 7, may be used in cooperation with a large circular screen arranged around the inside of the walls of a room such as those shown in Figs. 4 and 5.

The reflectors 20, 20' and 20" may be formed as hollow transparent shells with an inner silvering or other reflecting lining, but it is preferred that they be surface finished with the reflecting substance on the outer surface of the reflector. The shape of the surfaces and shells of the reflectors may be corrected for aberration.

Of course, an incomplete cyclorama, or segmental portions thereof, may be recorded and exhibited as well as a complete circular picture.

In order to make projection prints, the cylindrical member 26 in Fig. 6, may be the holder of a length of sensitized print paper which is inserted therein in cylindrical form and exposed momentarily to the rays of light that are projected through the circular representation 44 on film 22, reflected off sphere 20, and directed radially against the paper. Part of a scene as a panorama, or all of the cycloramic scene may be recorded on the paper.

Each image appears as an annular picture, with the objects that were in the 360° range of view, distributed around the outer portion of the image and conveying toward the center of the image. Of course, instead of being recorded on motion picture film, a single image may be recorded on a film or plate of a still camera.

Figure 4:
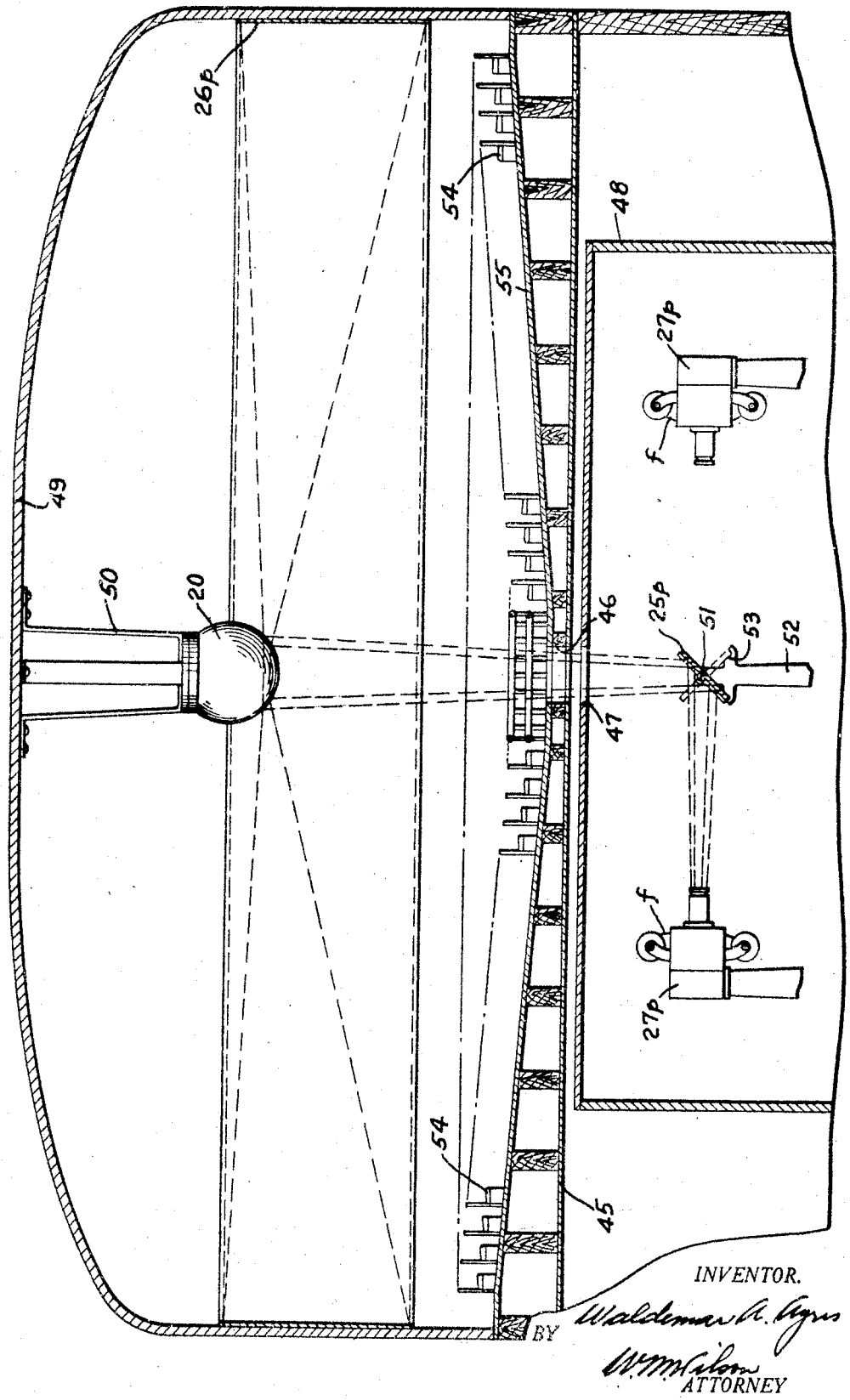
Fig. 4 is a sectional elevation view of an arrangement of projecting devices in a cycloramic picture exhibiting theatre.

Turning to Fig. 4 there is seen a sectional view of a projection room or theatre with a circular picture receiving screen 26p arranged around the inside of the walls of the room. The floor 45 of the theatre is cut away at 46 to coincide with an aperture 47 cut in the ceiling of the projection room 48 containing a pair of projectors 27p. The view illustrates the projector at the left operating to cast a circular image against the plane reflector 25p which is tipped at an angle to throw the light rays vertically up through the openings 46 and 47 against the spherical reflector 20 mounted on the ceiling 49 of the theatre by means of the hanger 50. The rays of light reflected off the sphere 20 are cast against the screene 26p to exhibit the cycloramic image around the inside of the theatre.

The plane reflector 25p is pivotally mounted at 51 on stand 52 so that it may be swung clockwise to rest in a notch 53 when it is desired to project pictures from the projector at the right.

In the theatre illustrated in Fig. 4 it is noted that the floor 55 slopes down toward the center of the room and the seats 54 face toward the center of the room. Another arrangement is shown in the building illustrated in Fig. 5. In this theatre of Fig. 5 the reflector 20, the screen 26p, and the projecting apparatus are arranged the same as in theatre of Fig. 4, however, in this modified arrangement, the flooring 56 is sloped from an elevated position at the center of the room down toward the walls of the room, and the seats 57 thereon are arranged concentrically facing the outer walls and the screen 26p.

While there has been shown and described and pointed out the fundamental novel features of the invention as applied to the several modifications, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is as follows:

1. In a device for projecting a cycloramic image, a circular screen, a hemispherical reflector mounted at the center of curvature of said screen, a pair of projectors stationed below said reflector, a mirror below the reflector and between the projectors and the reflector for reflecting rays of light from either projector to the reflector, a standard upon which said mirror is mounted, a hinged connection for assembling the mirror on the standard so that it may be turned towards either projector, and a pair of stops formed on said standard whereby the mirror may be positioned to cooperate with either projector in projecting rays of light to the reflector and screen.

2. In a device for printing a series of cycloramic pictures which appear as flat circular representations on films, a hemispherical reflector, a cylinder located concentric with said reflector, a pair of projectors stationed below said reflector, a mirror below the reflector and between the projectors and the reflector for reflecting rays of light from either projector to the reflector, a standard upon which said mirror is mounted, a hinged connection for assembling the mirror on the standard so that it may be turned towards either projector, and a pair of stops formed on said standard whereby the mirror may be positioned to cooperate with either projector in projecting rays of light to the reflector and said cylinder, said cylinder holding sheets of sensitized paper to receive alternately the rays of light directed through the films by the projector and reflected off said reflector.

3. In a device for projecting a picture, a screen, a pair of projectors, reflecting devices between said projectors and said screen, said devices including a mirror between the projectors for reflecting rays of light from either projector to the screen, a standard upon which said mirror is mounted, a hinged connection for assembling the mirror on the standard so that it may be turned towards either projector, and a pair of stops formed on said standard, whereby the mirror may be positioned to cooperate with either projector and direct rays of light to said screen.

WALDEMAR A. AYRES.